United States Patent [19]

Suzuki

[11] Patent Number: 5,712,711
[45] Date of Patent: Jan. 27, 1998

[54] HALFTONE IMAGE PROCESSING SYSTEM FOR SETTING DENSITY THRESHOLD VALUES

[75] Inventor: Yuzuru Suzuki, Ebina, Japan

[73] Assignee: Fuji Xerox Co., Ltd., Tokyo, Japan

[21] Appl. No.: 696,276

[22] Filed: Aug. 13, 1996

[30] Foreign Application Priority Data

Aug. 23, 1995 [JP] Japan ................................. 7-215050
Aug. 12, 1996 [JP] Japan ................................. 8-212765

[51] Int. Cl.$^6$ .......................... H04N 1/40; H04N 1/29; G01D 15/14
[52] U.S. Cl. ..................... 358/298; 358/300; 358/456; 358/466; 347/131
[58] Field of Search ............................. 358/298, 300, 358/455, 456, 458, 459, 465, 466; 347/131, 133, 144, 251–254

[56] References Cited

U.S. PATENT DOCUMENTS

| | | | |
|---|---|---|---|
| 4,782,398 | 11/1988 | Mita | 358/298 X |
| 5,432,611 | 7/1995 | Haneda et al. | 358/298 |
| 5,467,196 | 11/1995 | Fukushima et al. | 358/298 |
| 5,467,422 | 11/1995 | Itihara et al. | 358/298 |
| 5,495,278 | 2/1996 | Oda et al. | 347/252 |

FOREIGN PATENT DOCUMENTS

| | | |
|---|---|---|
| 52-49361 | 12/1977 | Japan . |
| 54-18302 | 2/1979 | Japan . |
| A-2-183676 | 8/1987 | Japan . |
| A-62-183670 | 8/1987 | Japan . |
| A-62-183680 | 8/1987 | Japan . |
| A-62-198266 | 9/1987 | Japan . |
| A-2-296264 | 12/1990 | Japan . |

*Primary Examiner*—Eric Frahm
*Attorney, Agent, or Firm*—Oliff & Berridge

[57] ABSTRACT

An image processing system for converting an input pixel into n subpixels $P_1, P_2, \ldots, P_n$, said system includes a comparator for comparing density threshold values $D_1, D_2, \ldots, D_n$ (where $D_1 < D_2 < \ldots < D_n$) corresponding to the subpixels $P_1, P_2, \ldots, P_n$ with a density of the input pixel, $D_{in}$; and a density setting unit for setting subpixels $P_1, P_2, \ldots, P_k$ corresponding to density threshold values $D_1, D_2, \ldots, D_k$ of the density threshold values $D_1, D_2, \ldots, D_n$ (where $k < n$) less than the density $D_{in}$ to a high density, setting subpixels $P_{k+2}, \ldots, P_n$ to a low density, and setting subpixel $P_{k+1}$ to an intermediate density.

14 Claims, 14 Drawing Sheets

FIG. 2A   FIG. 2B   FIG. 2C
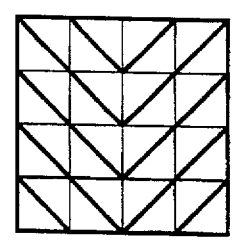
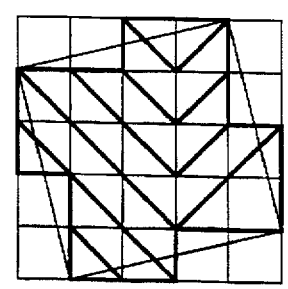
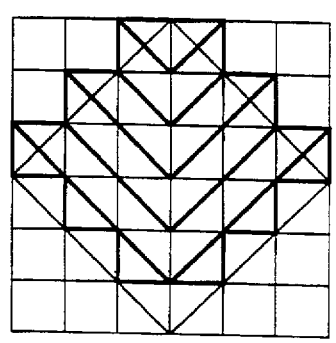
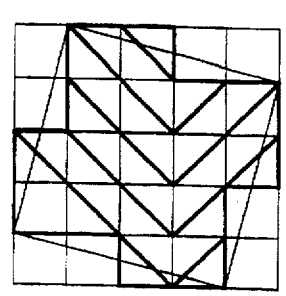
0°
14°
45°
76°

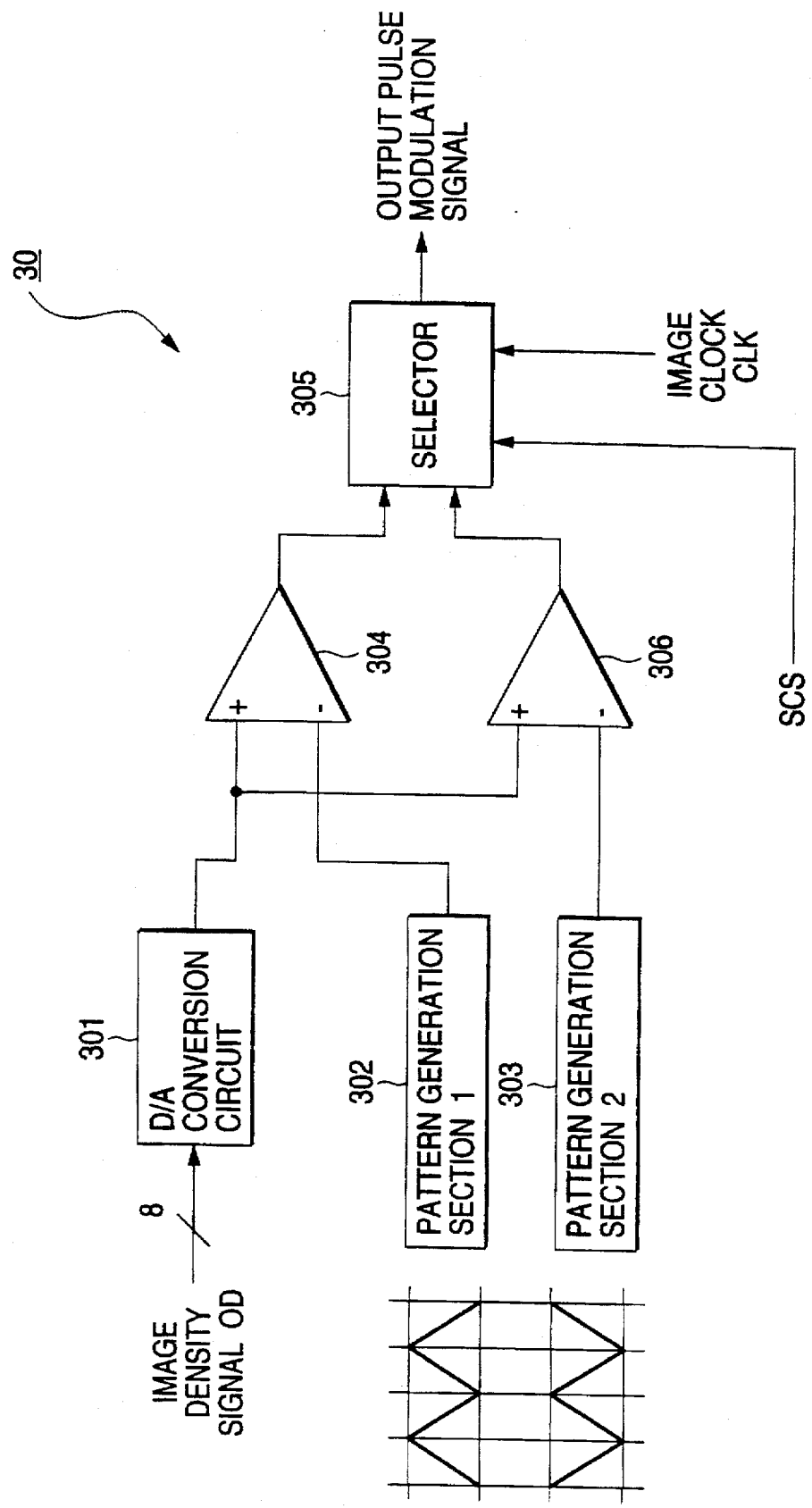

FIG. 5A
THRESHOLD VALUE MATRIX
(DENSITY THRESHOLD VALUE S)
FIG. 5B
INPUT IMAGE SIGNAL
FIG. 5C
IMAGE DENSITY SIGNAL OD
FIG. 5D
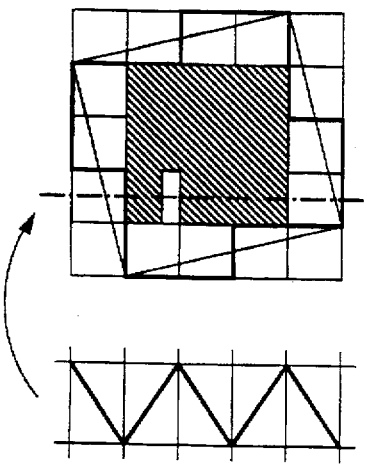
a. TRIANGULAR WAVE PATTERN 1
FIG. 5E
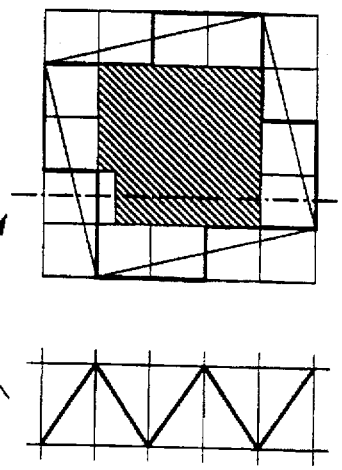
b. TRIANGULAR WAVE PATTERN 2
OUTPUT DOT SHAPE

FIG. 7A
PRIOR ART
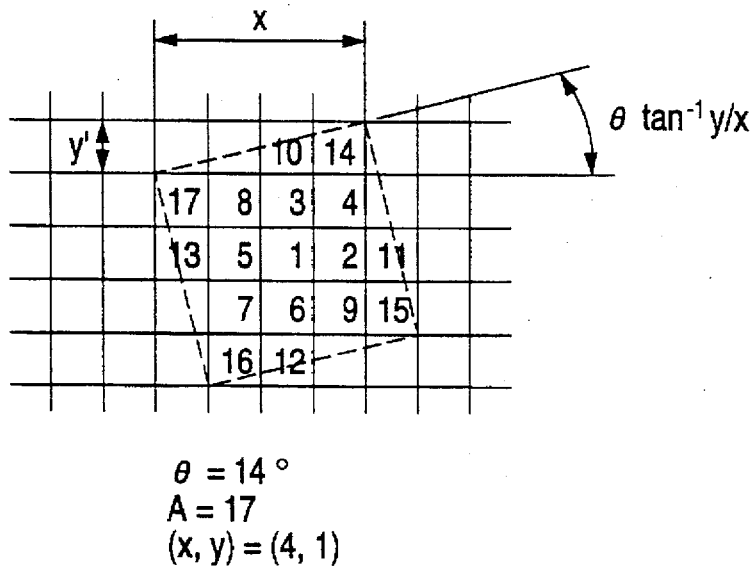
$\theta = 14°$
$A = 17$
$(x, y) = (4, 1)$
FIG. 7B
PRIOR ART
FIG. 7C
PRIOR ART
FIG. 7D
PRIOR ART
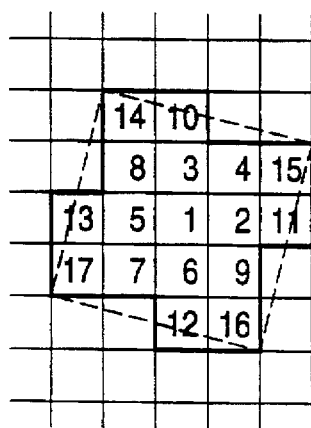 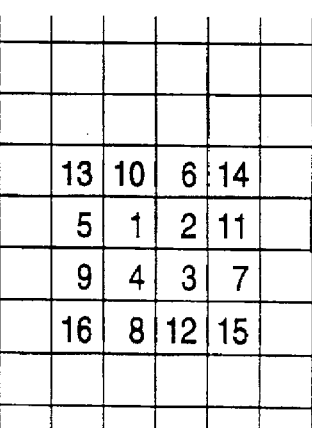 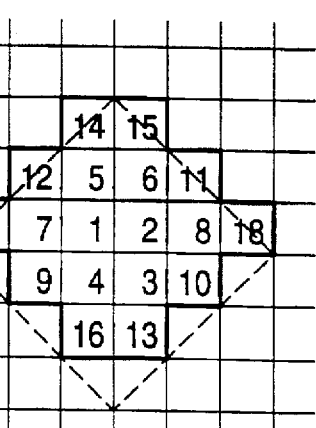
$\theta = 76°$
$A = 17$
$(x, y) = (1, 4)$
$\theta = 0°$
$A = 16$
$(x, y) = (4, 0)$
$\theta = 45°$
$A = 18$
$(x, y) = (3, 3)$

FIG. 13A PRIOR ART
| 216 | 152 | 88  | 232 |
| --- | --- | --- | --- |
| 72  | 8   | 24  | 168 |
| 136 | 56  | 40  | 104 |
| 200 | 120 | 184 | 248 |
THRESHOLD VALUE PATTERN SIGNAL
FIG. 13B PRIOR ART
| 182 | 182 | 182 | 182 |
| --- | --- | --- | --- |
| 182 | 182 | 182 | 182 |
| 182 | 182 | 182 | 182 |
| 182 | 182 | 182 | 182 |
INPUT IMAGE SIGNAL
FIG. 13C PRIOR ART
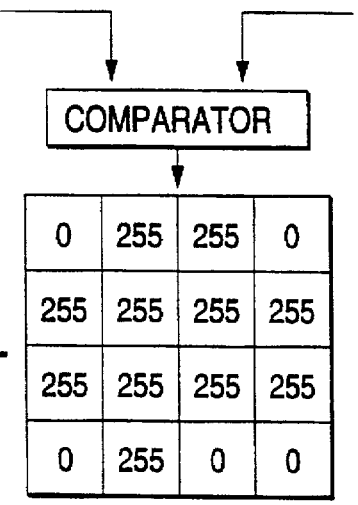
| 0   | 255 | 255 | 0   |
| --- | --- | --- | --- |
| 255 | 255 | 255 | 255 |
| 255 | 255 | 255 | 255 |
| 0   | 255 | 0   | 0   |
FIG. 14A
| 224 | 160 | 96  | 240 |
| --- | --- | --- | --- |
| 80  | 16  | 32  | 176 |
| 144 | 64  | 48  | 112 |
| 208 | 128 | 192 | 255 |
THRESHOLD VALUE PATTERN SIGNAL
FIG. 14B
| 182 | 182 | 182 | 182 |
| --- | --- | --- | --- |
| 182 | 182 | 182 | 182 |
| 182 | 182 | 182 | 182 |
| 182 | 182 | 182 | 182 |
INPUT IMAGE SIGNAL
FIG. 14C
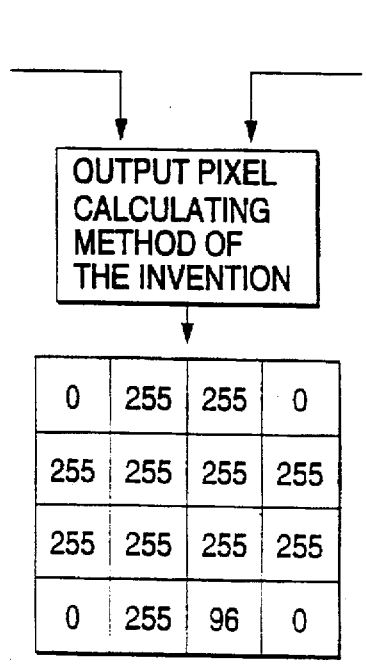
| 0   | 255 | 255 | 0   |
| --- | --- | --- | --- |
| 255 | 255 | 255 | 255 |
| 255 | 255 | 255 | 255 |
| 0   | 255 | 96  | 0   |

GRADATION CHARACTERISTIC AFTER CORRECTION

GRADATION CHARACTERISTIC BEFORE CORRECTION

HALFTONE IMAGE PROCESSING SYSTEM FOR SETTING DENSITY THRESHOLD VALUES

BACKGROUND OF THE INVENTION

1. Field of the Invention

This invention relates to a preferred image processing system used to output a halftone in electrophotographic digital copiers, printers, etc.

2. Description of the Related Art

A halftone dot image reproduction system and a triangular wave comparison system are known as systems for outputting a halftone in electrophotographic digital copiers, printers, etc. An outline of these systems will be given below:

<Halftone dot reproduction system>

The halftone dot reproduction system (density pattern system) divides one pixel of input image data, which will be hereinafter referred to as an input pixel, into subpixels and predetermines a density threshold value corresponding to each subpixel. FIG. 13A shows a density threshold value example where the input pixel density is represented by 256-level gray scale and the input pixel is divided into 16 (4×4) subpixels. The density threshold value pattern as shown in FIG. 13A is called a screen pattern.

For each density threshold value, the gradation range (0–255) is divided into equal parts by the number of subpixels and the density threshold value is set to the average of each range (fractional digits are rounded off to units). Therefore, in the example shown in FIG. 13A, the density threshold values become 8, 24, 40, ... Here, numbers (1, 2, 3, ... ) are assigned to the density threshold values in the ascending order. These numbers are called density threshold value numbers.

Next, the density threshold values are compared with the density of the input pixel for determining the on or off state of each subpixel. That is, the subpixels corresponding to the density threshold values lower than the density of the input pixel are set to the on state and other pixels are set to the off state. FIG. 13C shows an example of the on state and off state of subpixels when the input pixel density is 182 (255 is the on state and 0 is the off state).

By the way, to adopt the halftone dot image reproduction system for color copiers, etc., the above-described process may be executed for each primary color (K, Y, M, C). However, if the same screen pattern is used for the colors, a slight position difference causes inconsistencies in color to occur or the effect of a moire pattern occurring when halftone dots of primary colors overlap increases. Then, generally four screen patterns different in screen angle θ are used in a one-to-one correspondence with the primary colors, as shown in FIGS. 7A to 7D (Japanese Patent Laid-Open Nos. Sho 52-49361 and Sho 54-18302).

In fields of screen printing, etc., it is known that preferred setting of the screen angles θ is 0°, 15°, 45°, and 75°. However, to apply to copiers, etc., the screen angle θ needs to be set to a value found by rational tangent because the same screen pattern is repeatedly used to reduce the memory capacity. FIG. 6 shows a state in which the same screen patterns are arranged, wherein the numerals are density threshold value numbers.

Further, it is also necessary to match the primary colors in the number of subpixels as much as possible. In the example shown in FIGS. 7A to 7D, the screen angle θ lies within ±2° of the preferred angle and the number of subpixels A lies within the range of 17±1; they are sufficient in practical use. The screen pattern shown in FIG. 7C corresponds to that shown in FIG. 13A.

By the way, the halftone dot image reproduction system is furthermore classified into a density pattern method and a dither method. The density pattern method is a method for representing the gradation of one pixel of input image data by subpixels and corresponds to the method described with reference to FIGS. 13A to 13C. On the other hand, the dither method is a method for relating input and output pixels in a one-to-one correspondence with each other and comparing the pixel values of the input pixels with a threshold value, thereby determining the pixel values of the output pixels. That is, the method requires 16 input pixel values to obtain a pattern as shown in FIG. 13C.

<Triangular wave comparison system>

Next, in the triangular wave comparison system, first the density of an input pixel is converted into an analog signal. A comparator compares a triangular wave of a predetermined cycle with the analog signal. If the level of the analog signal is greater than that of the triangular wave, the on state (for example, laser exposure state) is set; otherwise, the off state is set. That is, the higher the input pixel density, the higher the analog signal level, the higher the duty ratio with the on state set as the comparison result, and the higher the output image density.

By the way, techniques for giving screen angle θ for each primary color to suppress the effects of inconsistencies in color and moire patterns are also known for performing color printing in the triangular wave comparison system. For example, a technique for shifting the phase of a triangular wave a given amount each time one line advances in the vertical scanning direction is disclosed in Japanese Patent Laid-Open No. Sho 62-183670. A technique for changing a gray scale reproduction characteristic each time one line advances in the vertical scanning direction is disclosed in Japanese Patent Laid-Open No. Hei 2-296264.

However, the conventional systems and techniques described above involve the following problems: First, in the halftone dot image reproduction system, contradictory relation exists between the resolution and the number of reproduction gray levels. For example, if the resolution of an output unit is 400 dpi (dots per inch) and a resolution of 200 lpi (lines per inch) is desired, the screen size needs to be set to 2×2. That is, the number of reproduction gray levels becomes four; only the extremely low number of gray levels is obtained. In contrast, to set the number of reproduction gray levels to 64, the screen size needs to be set to 4×4. Thus, the resolution drastically lowers to "400/8=50" lip.

To perform screen printing, since the output unit originally has a resolution of about 4000 dpi, image coarseness is unobtrusive to the naked eyes even if the number of reproduction gray levels is set large. However, since the resolution of about 400–600 is a limit in the electrophotographic system, a problem as described above occurs.

On the other hand, in the triangular wave comparison system, no contradictory relation exists between the resolution and the number of reproduction gray levels. However, it is poor in practical use to give screen angle θ to each primary color by the above-described technique. The reason will be discussed with reference to FIGS. 8A and 8B. In FIG. 8A, S1 is an analog signal, which is compared with a triangular wave signal. The phase of the triangular wave signal is gradually delayed every line in the vertical scanning direction.

FIG. 8B shows an exposure pattern of laser obtained according to the comparison result. As seen in FIG. 8B, shifting the phase of the triangular wave every line in the vertical scanning direction easily results in loss, discontinuance. etc., of halftone dots and the screen shape. Thus, the gradation characteristic and granularity reproduction are adversely affected and it is difficult to provide a satisfactory image quality. Further, the screen angle θ and the number of screen lines (resolution) are restricted by the cycle of the triangular wave pattern used and is less flexible.

SUMMARY OF THE INVENTION

It is therefore an object of the invention to provide an image processing system which has no contradictory relation between the resolution and the number of reproduction gray levels and moreover can provide high-quality output images stably.

According to a first aspect of the invention, there is provided an image processing system for converting an input pixel into n subpixels P1, P2, ..., Pn, the system comprising means for comparing density threshold values D1, D2, ..., Dn (where D1<D2<...<Dn) corresponding to the subpixels P1, P2, ..., Pn with a density of the input pixel, Din, and density setting means for setting subpixels P1, P2, ..., Pk corresponding to density threshold values D1, D2, ..., Dk of the density threshold values D1, D2, ..., Dn (where k<n) less than the density Din to a high density, setting subpixels Pk+2, ..., Pn to a low density, and setting subpixel Pk+1 to an intermediate density.

In a second aspect of the invention, in the image processing system as defined in the first aspect of the invention, the density setting means comprises analog signal generation means for generating an analog signal based on the relationship between the density Din and the density threshold values Dk and Dk+1, reference signal generation means for outputting a predetermined reference signal, and a comparison circuit for comparing the analog signal with the reference signal, and sets a part of the area corresponding to subpixel Pk+1 to a high density and other portions to a low density based on the output signal of the comparison circuit.

In a third aspect of the invention, in the image processing system as defined in the second aspect of the invention, the reference signal generation means comprises first triangular wave signal generation means for generating a first triangular wave signal, second triangular wave signal generation means for generating a second triangular wave signal having a 180-degree phase difference from the first triangular wave signal, selection condition storage means for storing selection data for specifying either a rising state or a falling state corresponding to each of the subpixels P1, P2, ..., Pn, and selection means for selecting either the first or second triangular wave signal based on the selection data corresponding to the subpixel Pk+1 and outputting the selected signal as the reference signal.

According to a fourth aspect of the invention, there is provided an image processing system for converting n input pixels Q1, Q2, ..., Qn into n output pixels R1, R2, ..., Rn corresponding thereto, the system comprising means for comparing density threshold values D1, D2, ..., Dn (where D1 D2<...<Dn) corresponding to the output pixels R1, R2, ..., Rn with densities of the corresponding input pixels Q1, Q2, ..., Qn and density setting means for setting output pixels R1, R2, ..., Rk corresponding to density threshold values D1, D2, ..., Dk of the density threshold values D1, D2, ..., Dn (where k<n) less than the densities of the corresponding input pixels Q1, Q2, ..., Qn to a high density, setting output pixels Rk+2, ..., Rn to a low density, and setting output pixel Rk+1 to an intermediate density.

In a fifth aspect of the invention, in the image processing system as defined in the fourth aspect of the invention, the density setting means comprises analog signal generation means for generating an analog signal based on the relationship between the input pixels Qk and Qk+1 and the density threshold values Dk and Dk+1, reference signal generation means for outputting a predetermined reference signal, and a comparison circuit for comparing the analog signal with the reference signal, and sets a portion of the area corresponding to output pixel Rk+1 adjoining any of output pixels R1, R2, ..., Rk to a high-density area and other portions to a low density based on the output signal of the comparison circuit.

In a sixth aspect of the invention, in the image processing system as defined in the fifth aspect of the invention, the reference signal generation means comprises first triangular wave signal generation means for generating a first triangular wave signal, second triangular wave signal generation means for generating a second triangular wave signal having a 180-degree phase difference from the first triangular wave signal, selection condition storage means for storing selection data for specifying either a rising state or a falling state corresponding to each of the output pixels R1, R2, ..., Rn, and selection means for selecting either the first or second triangular wave signal based on the selection data corresponding to the output pixel Rk+1 and outputting the selected signal as the reference signal.

In a seventh aspect of the invention, in the image processing system as defined in the first to fourth aspects of the invention, the density setting means comprises gradation correction means for correcting gradation of the intermediate density.

According to an eighth aspect of the invention, there is provided an image processing system comprising reference signal generation means for generating a plurality of reference signals, means for storing growth patterns provided in a one-to-one correspondence with n subpixels P1, P2, ..., Pk, and means for selecting one of the reference signals based on the contents stored in the growth pattern storage means.

In the first or fourth aspect of the invention, the density setting means sets subpixel Pk+1 (or output pixel Rk+1) to an intermediate density, whereby even if the number of subpixels (or the number of output pixels), n, is small, the number of reproduction gray levels can be set to a high value.

Further, in the second, third, fifth and sixth aspects of the invention, the image processing system sets a portion of the area corresponding to intermediate-density subpixel Pk+1 (or output pixel Rk+1) adjoining any of subpixels P1, P2, ..., Pk (or output pixels R1, R2, ..., Rk) to a high-density area and other portions to a low density, so that the halftone dot shade is not lost and high-quality output images can be provided stably.

Further, in the seventh aspect of the invention, since intermediate-density reproductivity can be corrected by the gradation correction means, smooth gradation productivity with no pseudo contour can be provided.

Also, in the eighth aspect of the invention, the image processing system can select an optimum waveform corresponding to a growth pattern from among a plurality of reference signals, thus can generate halftone dots of smooth shape and provide high-quality output images stably.

BRIEF DESCRIPTION OF THE DRAWING

In the accompanying drawings:

FIGS. 2A to 2C are illustrations of the operation of the first embodiment of the invention;

FIG. 4 is a block diagram of a waveform control multi-value conversion circuit;

FIGS. 5A to 5E are illustrations of the operation of the first embodiment of the invention;

FIGS. 7A to 7D are illustrations of the operation of a conventional image processing system;

FIGS. 13A to 13C are illustrations of the operation of a conventional image processing system;

FIGS. 14A to 14C are illustrations of the operation of image processing systems of the first to fourth embodiments;

DETAILED DESCRIPTION OF THE PREFERRED EMBODIMENTS

Now, a description will be given in more detail of embodiments of the present invention with reference to the accompanying drawing.

I. First embodiment

A. Configuration of embodiment

A-1. Screen angle generation threshold value control circuit 10

Figure 1:
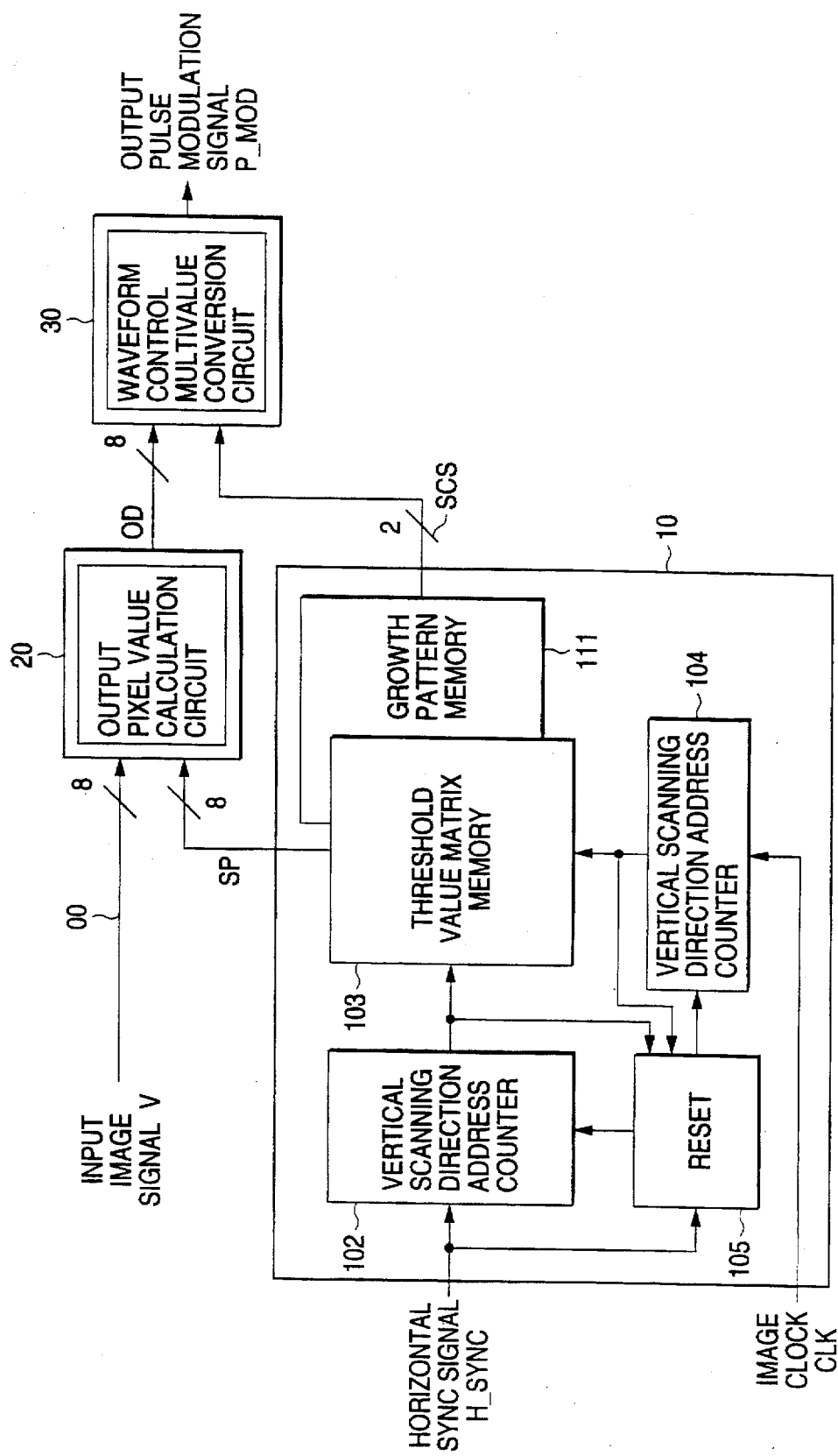
FIG. 1 is a block diagram of an image processing system of a first embodiment of the invention.

Referring to FIG. 1, a first embodiment of the invention will be discussed.

In the figure, numeral 10 is a screen angle generation threshold value control circuit which contains a vertical scanning direction address counter 102. This vertical scanning direction address counter 102 counts horizontal scanning signal H_SYNC and outputs the count result. Numeral 104 is a horizontal scanning direction address counter which counts pixel clock CLK and outputs the count result.

Numeral 105 is a reset circuit. When the horizontal synchronizing signal H_SYNC is input to the screen angle generation threshold value control circuit 10 or the count of the horizontal scanning direction address counter 104 reaches a predetermined reset value (4, 6, or 17 if the screen pattern shown in FIGS. 7A to 7D is used), the reset circuit 105 resets the horizontal scanning direction address counter 104, thereby resetting the count to 0.

Likewise, when the count of the vertical scanning direction address counter 102 reaches the reset value, the reset circuit 105 resets the vertical scanning direction address counter 104. Numeral 103 is a threshold value matrix memory having a memory capacity of 17×17 bytes, which is accessed according to the counts of the address counters 102 and 104. The threshold value matrix memory 103 stores the arrangement contents of a screen pattern used.

Figure 6:
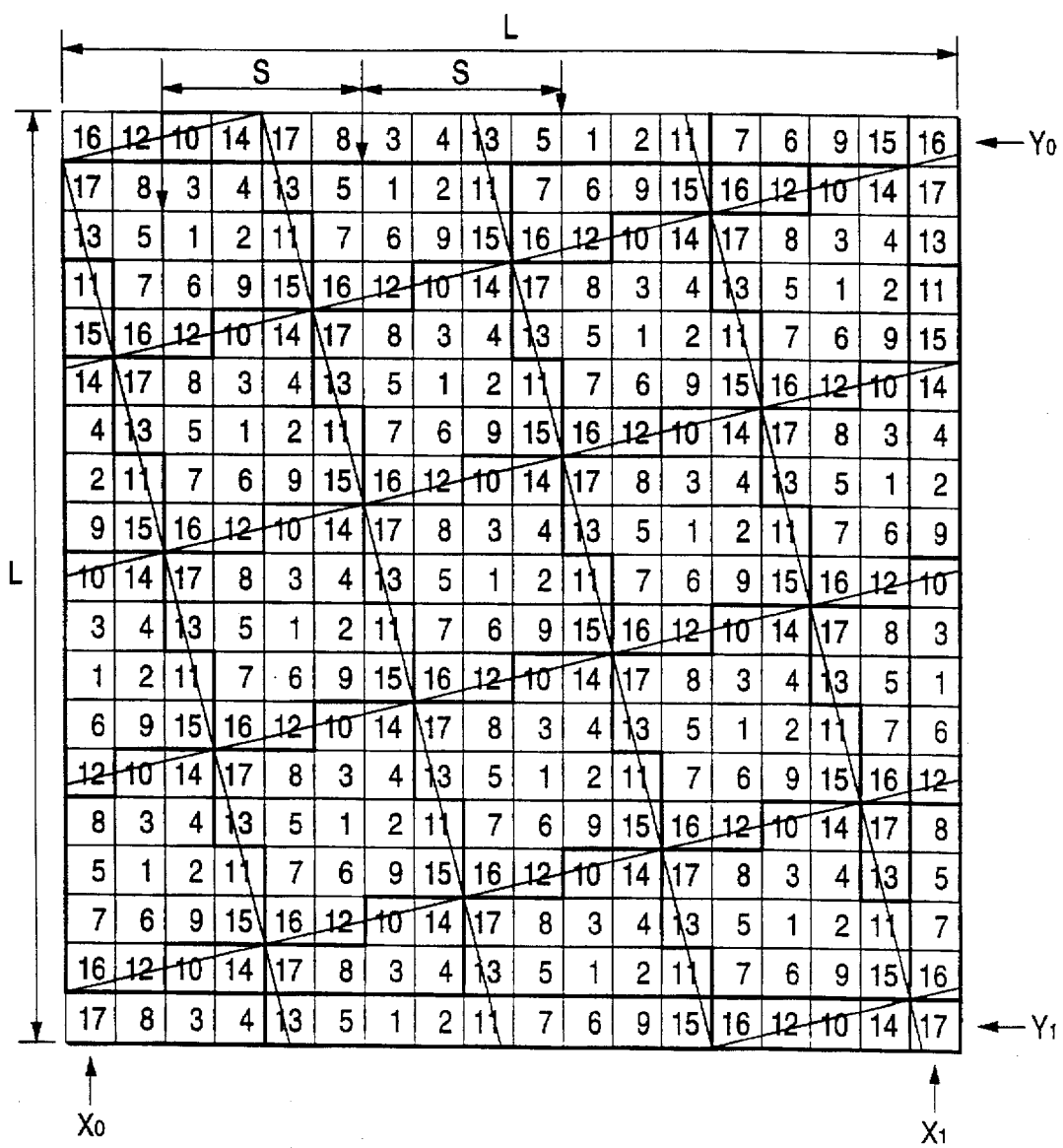
FIG. 6 is an illustration of the operation of a conventional image processing system.
Figure 8A:
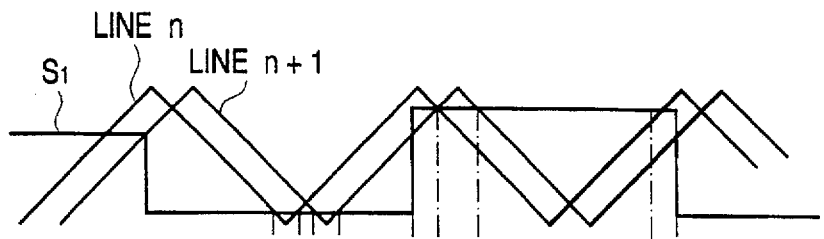
FIGS. 8A and 8B are illustrations of the operation of a conventional image processing system.
Figure 8B:
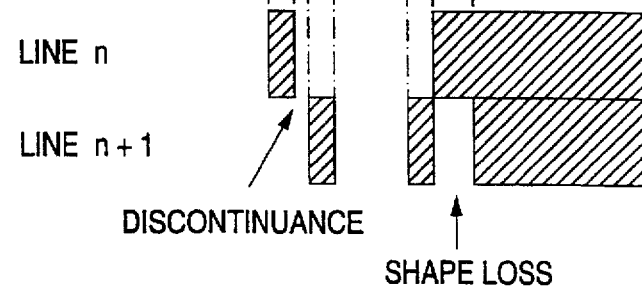

For example, to use the screen pattern in FIG. 7A, the threshold value matrix memory 103 stores the contents of 17×17 vertically and horizontally contiguous frames in FIG. 6 (density threshold values), whereby density threshold value S responsive to the counts of the address counters 102 and 104 is output from the threshold value matrix memory 103. Next, FIG. 2A shows density threshold value patterns corresponding to the screen pattern, wherein the density threshold values corresponding to the screen angle of 0 degrees result from adding 8 or 7 to the density threshold values shown in FIG. 13A.

The density threshold values shown in FIG. 2A denote the density values (or weights) of the subpixels with respect to the number of quantization steps that can be reproduced by the entire screen pattern (the number of gradation steps). That is, since the density threshold values are 16, 32, 48, . . . , 255 in the ascending order, the maximum density threshold value of the subpixels set to the on state denotes the average density of the entire screen pattern with the subpixel set to on (black).

For example, to represent 255 gray levels by a 4×4=16-element screen pattern, if only the first subpixel is set to the on state, the average density of the entire screen pattern is 1/16×255≈16; if the first two subpixels are set to on (black), the average density is 2/16×255≈32.

By the way, the above-mentioned reset value is set in response to the screen pattern used. That is, if the screen pattern shown in FIG. 7A or 7B is used, the same pattern is repeated every 17 vertical and horizontal bits (see FIG. 6), thus the reset value is set to 17. Likewise, to use the screen pattern in FIG. 7C, the reset value is set to 4; to use the screen pattern in FIG. 7D, the reset value is set to 6.

Next, numeral 111 is a growth pattern memory which has a memory capacity of 17×17 bits and stores a value of "1" or "0" (growth pattern) corresponding to each byte of the threshold matrix memory 103 (each frame in FIG. 6), where "0" indicates a pattern of growing dots from right and "1" indicates a pattern of growing dots from left. One growth pattern in the growth pattern memory 111 is accessed according to the counts of the address counters 102 and 104 and is output as screen change signal SCS. FIG. 2B shows the growth patterns corresponding to the screen patterns.

A-2. Output pixel value calculation circuit 20

Figure 3:
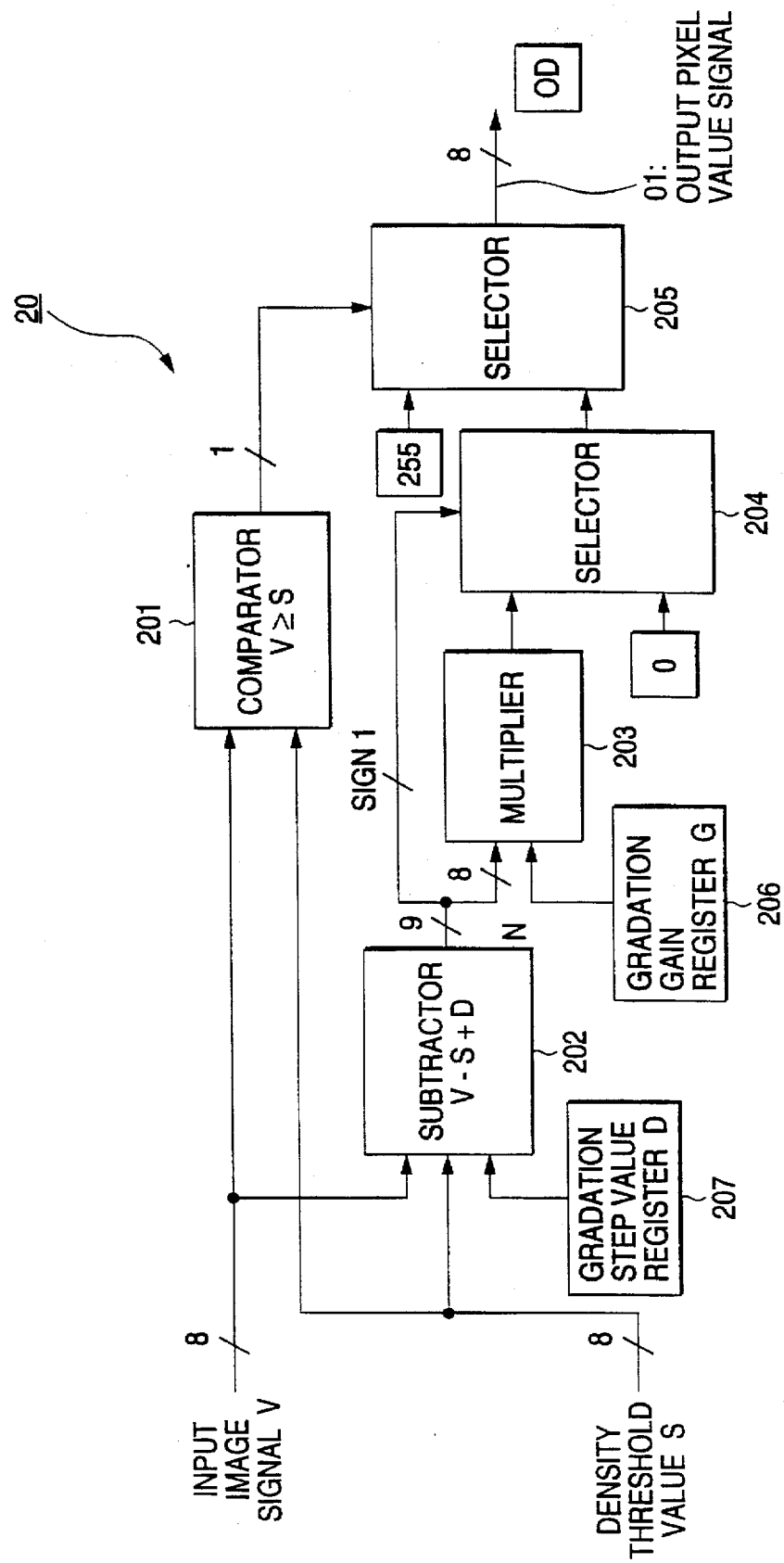
FIG. 3 is a block diagram of an output pixel value calculation circuit 20.

Next, the configuration of an output pixel value calculation circuit 20 will be discussed with reference to FIG. 3.

In the figure, numeral 201 is a comparator which compares input image signal (pixel density) V with density threshold value S. Numeral 207 is a gradation step value register which stores a predetermined gradation step value D. This gradation step value D is set to a value resulting from dividing the number of gray levels (gradation steps) of the input image signal V by the number of subpixels in a screen pattern (fractional digits are rounded off to units).

Since the number of gray levels is 256 in the example, if the screen pattern in FIG. 7C (the number of subpixels is 16) is used, the gradation step value D becomes 16 (256/16).

Next, numeral 202 is a subtractor which performs calculation on the input image signal V, density threshold value S, and gradation step value D based on the following expression (1) to find value N and outputs the value N:

Expression 1

$$N=V-S+D$$

Numeral 206 is a gradation gain register which stores gradation gain G. The gradation gain G is set so as to equal the number of subpixels in the screen pattern in FIGS. 7A to 7D (in the example, 16, 17, or 18). Numeral 203 is a multiplier which multiplies the gradation gain G by the value N and outputs the result. Numeral 204 is a selector which references the sign bit of the value N and if the value N is negative, outputs value 0; otherwise, outputs the multiplication result. Numeral 205 is a selector which outputs value 255 if the comparison result of the comparator 201 is V≧S; otherwise, outputs the output value of the selector 204. The output signal of the selector 205 will be hereinafter called image density signal OD.

Here, the principles of putting into halftone dots by the conventional binarization system and the output pixel value calculation method of the embodiment will be discussed in comparison with each other. FIGS. 13A to 13C show the principles of putting into halftone dots by the conventional binarization system and assumes that the input signal is input as a signal having area percentage of 182/255=71%. In such a case, if a 4×4-element screen pattern (threshold value pattern) as shown in the figure is used for binarization, 11 output pixels are set to on (255) and the remaining five output pixels are set to off (0).

The area percentage of the output signal at this time becomes (255×11)/(255×16)×100%=69% and only quantization levels as many as 4×4=16 gray levels are provided. Therefore, in such a case, a quantization error in quantization steps in 1/16=6.25% units occurs and satisfactory picture quality cannot be obtained. Even if 12 output pixels are set to on (255), the area percentage of the output signal at this time becomes (255×12)/(255×16)×100% =75% and a 6% quantization error occurs.

In contrast, according to the output pixel value calculation method of the embodiment shown in FIGS. 14A to 14C, a screen pattern matrix representing the weight of each of 4×4=16 pixels (percentage to the solid density level (255) when the pixels of up to the pixel are set to on) is used, and the output density levels of the 4×4 output pixels are calculated by a determination method described below without performing any feedback operation.

Since output pixels at intermediate density level can be controlled so as to minimize a reproduction quantization error between input and output, the area percentage of the output signal becomes (255×11+96)/(255×16)×100%=71%. If this is applied to an 8-bit input/output system, gradation representation in 256 quantization steps, namely, within a quantization error of 1/256=0.4% or less is enabled.

Next, the calculation operation will be discussed with reference to FIG. 3. Here, a specific example will be described by assuming that the value of input image signal V is 182 and that the values of 0 degrees in FIG. 2A are output from the threshold value matrix memory 103. First, if the input image signal V is 182, V≧S holds for the density threshold value S of 16, 32, . . . , 176. Therefore, for the density threshold value S, the image density signal OD becomes 255 (highest density). If the density threshold value S is 192, 208, . . . , 255, V<S holds. Therefore, the output signal of the selector 204 becomes the image density signal OD.

Here, if the density threshold value is 208, . . . , 255, the value N becomes negative from Expression (1). Therefore, the image density signal OD of value 0 (lowest density) is output via the selectors 204 and 205. Thus, if the density threshold value S is a value other than 192, the image density signal OD becomes 255 (highest density) or value 0 (lowest density). However, in the embodiment, the image density signal OD when the density threshold value S is 192 differs.

First, if the density threshold value S is 192, the value N becomes 6 (=182−192+16) from Expression 1 and the multiplication result of the multiplier 203 becomes 96 (6×16). This multiplication result is output as the image density signal OD via the selectors 204 and 205. That is, for a subpixel whose density threshold value S is 192, the image density signal OD is set to intermediate density 96. If the image density signal OD is intermediate density, the area of the portion in the on-state of the corresponding subpixel is set accordingly, which will be discussed in detail later.

A-3. Waveform control multivalue conversion circuit 30

Next, the configuration of a waveform control multivalue conversion circuit 30 will be discussed with reference to FIG. 4.

In the figure, numeral 301 is a digital-analog conversion circuit which converts the image density signal OD into an analog signal and outputs the analog signal. Numerals 302 and 303 are pattern generation sections which output triangular wave signals having a phase difference of 180 degrees therebetween. Numerals 304 and 306 are comparators, each of which compares the corresponding triangular wave signal with the analog signal and outputs the comparison result as a digital signal.

That is, if the level of the analog signal is equal to or more than the level of the triangular wave signal, the digital signal is set to "1;" otherwise, set to "0." Numeral 305 is a selector which selects and outputs one of the digital signals based on the screen change signal SCS (contents of the growth pattern memory 111) and in synchronization with the pixel clock CLK. The output signal is output as an output pulse modulation signal for a laser diode.

FIG. 2C shows the waveforms of triangular wave signals in portions corresponding to selected digital signals. Comparing FIGS. 2B and 2C, if the screen change signal SCS (growth pattern) is "0," the digital signal corresponding to the triangular wave signal in a half period of the falling edge is selected and in the system, the pixel is dotted from the right. On the other hand, if the screen change signal SCS is "1," the digital signal corresponding to the triangular wave signal in a half period of the rising edge is selected and the pixel is dotted from the left.

Therefore, which of the digital signals output from the comparators 304 and 305 is chosen is not uniquely determined by the screen change signal SCS only. For example, when the screen change signal SCS remains a given value and pixel clock CLK is input more than once, the selector 305 selects both digital signals alternately.

B. Operation of embodiment

Next, the operation of the embodiment will be discussed. To use the image processing system of the embodiment to output a color image, output processing of yellow (Y) is first performed.

The memories, registers, counters, etc., are reset and the screen pattern and the growth pattern related to 0 degrees in FIGS. 2A and 2B are written into the threshold value matrix memory 103 and the growth pattern memory 111 in FIG. 1 respectively. The reset value in the reset circuit 105 is set to 4.

Further, value 16 is written into the gradation step value register 207 and the gradation gain register 206 in the output pixel value calculation circuit 20 in response to the screen pattern. Next, pixel clock CLK is supplied to the horizontal scanning direction address counter 104 and input image signal V related to yellow (Y) is supplied to the output pixel value calculation circuit 20. The horizontal scanning direction address counter 104 counts the pixel clock CLK. When the count reaches 4, it is reset by the reset circuit 105. Also, 0 is output from the vertical scanning direction address counter 102.

Thus, four addresses in the threshold value matrix memory 103 from the address with Y (vertical scanning direction)=0, X (horizontal scanning direction)=0 to the address with Y (vertical scanning direction)=0, X (horizontal scanning direction)=3 are repeatedly accessed and the four density threshold values S corresponding thereto are repeatedly supplied to the output pixel value calculation circuit 20, which then selects value 255 or 0 or intermediate density based on the comparison result of the comparator 201 and the sign bit of the value N output from the subtractor 202, and outputs the selected value as image density signal OD.

In the growth pattern memory 111, the screen change signal SCS corresponding to the density threshold value S is output. When scanning one line in the vertical scanning direction is thus complete, horizontal synchronizing signal H_SYNC is supplied to the screen angle generation threshold value control circuit 10, whereby the count of the vertical scanning direction address counter 102 is incremented and the count of the horizontal scanning direction address counter 104 is reset.

Scanning the next line is started. When horizontal synchronizing signal H_SYNC is input to the vertical scanning direction address counter 102 after 4-line scanning is complete, the count of the vertical scanning direction address counter 102 is set to 4. When detecting this state, the reset circuit 105 resets the count of the vertical scanning direction address counter 102 to 0.

After this, likewise when input image signal V is supplied to the output pixel value calculation circuit 20 in synchronization with pixel clock CLK, the threshold value matrix memory 103 and the growth pattern memory 111 are accessed and subpixel is supplied to the output pixel value calculation circuit 20 and screen change signal SCS is supplied to the waveform control multivalue conversion circuit 30, whereby the image density signals OD of yellow (Y) for one page are supplied to the waveform control multivalue conversion circuit 30 in sequence.

At the termination of output of yellow (Y), then output processing of magenta (M) is performed.

First, the memories, registers, counters, etc., are reset and the screen pattern and the growth pattern related to 14 degrees in FIGS. 2A and 2B are written into the threshold value matrix memory 103 and the growth pattern memory 111 respectively. The reset value in the reset circuit 105 is set to 17.

Further, value 17 is written into the gradation step value register 207 and the gradation gain register 206 in the output pixel value calculation circuit 20 in response to the screen pattern. When pixel clock CLK is supplied to the screen angle generation threshold value control circuit 10 and input image signal V of magenta (M) is supplied to the output pixel value calculation circuit 20, similar processing to that described for yellow (Y) is performed and the image density signals OD of magenta (M) for one page are supplied to the waveform control multivalue conversion circuit 30 in sequence.

At the termination of output of magenta (M), then output processing of color K is performed.

First, the memories, registers, counters, etc., are reset and the screen pattern and the growth pattern related to 45 degrees in FIGS. 2A and 2B are written into the threshold value matrix memory 103 and the growth pattern memory 111 respectively. The reset value in the reset circuit 105 is set to 6.

Further, value 18 is written into the gradation step value register 207 and the gradation gain register 206 in the output pixel value calculation circuit 20 in response to the screen pattern. When pixel clock CLK is supplied to the screen angle generation threshold value control circuit 10 and input image signal V of color K is supplied to the output pixel value calculation circuit 20, similar processing to that described for yellow (Y) is performed and the image density signals OD of color K for one page are supplied to the waveform control multivalue conversion circuit 30 in sequence.

At the termination of output of color K, then output processing of cyan (C) is performed.

First, the memories, registers, counters, etc., are reset and the screen pattern and the growth pattern related to 76 degrees in FIGS. 2A and 2B are written into the threshold value matrix memory 103 and the growth pattern memory 111 respectively. The reset value in the reset circuit 105 is set to 17.

Further, value 17 is written into the gradation step value register 207 and the gradation gain register 206 in the output pixel value calculation circuit 20 in response to the screen pattern. When pixel clock CLK is supplied to the screen angle generation threshold value control circuit 10 and input image signal V of cyan (C) is supplied to the output pixel value calculation circuit 20, similar processing to that described for yellow (Y) is performed and the image density signals OD of cyan (C) for one page are supplied to the waveform control multivalue conversion circuit 30 in sequence.

FIG. 5C shows an example of the image density signal OD generated based on the density threshold value S and the input image signal V. When the image density signal OD related to each color is thus supplied to the waveform control multivalue conversion circuit 30, it is converted into an analog signal through the D/A conversion circuit 301. A triangular wave signal different in phase is output from the pattern generation section 302. If the image density signal OD is 255, the digital signals output from the comparators 304 and 306 always become "1," so that the duty ratio of the output pulse modulation signal becomes 100%.

If the image density signal OD is 0, the digital signals always become "0," so that the duty ratio of the output pulse modulation signal becomes 0%. If the image density signal OD is an intermediate density, the duty ratio of the output pulse modulation signal becomes a value responsive to the intermediate density. At the time, the halftone dot shape shown in FIG. 5D or 5E is possible in response to the triangular wave signal used.

However, in the embodiment, switch processing in the selector 305 is performed so that a triangular wave pattern as shown in FIG. 2C is adopted. Therefore, the halftone dot shape cannot become as shown in FIG. 5D and always becomes as shown in FIG. 5E. That is, in the embodiment, if there is a second subpixel contiguous with a first subpixel at an intermediate density in the horizontal scanning direction and having a density threshold value lower than the first subpixel, a triangular wave signal is selected so that the on-state portions of the first and second subpixels are continuous.

C. Effects of the embodiment

1) As we have discussed, according to the embodiment, a subpixel satisfying conditions that input image signal density threshold value S and that value N (N=V−S+D) is not negative is set to an intermediate density responsive to the value N. That is, contradictory relation does not exist between the resolution and the number of reproduction gray levels and even if the number of subpixels making up a screen pattern is small, a sufficient number of reproduction gray levels can be provided.

2) Further, according to the embodiment, if there is a second subpixel contiguous with a first subpixel at an intermediate density in the horizontal scanning direction and having a density threshold value lower than the first subpixel, a triangular wave signal is selected so that the on-state portions of the first and second subpixels are continuous, whereby loss of the screen shape can be prevented and high-quality output images can be provided stably.

II. Second embodiment

Figure 10:
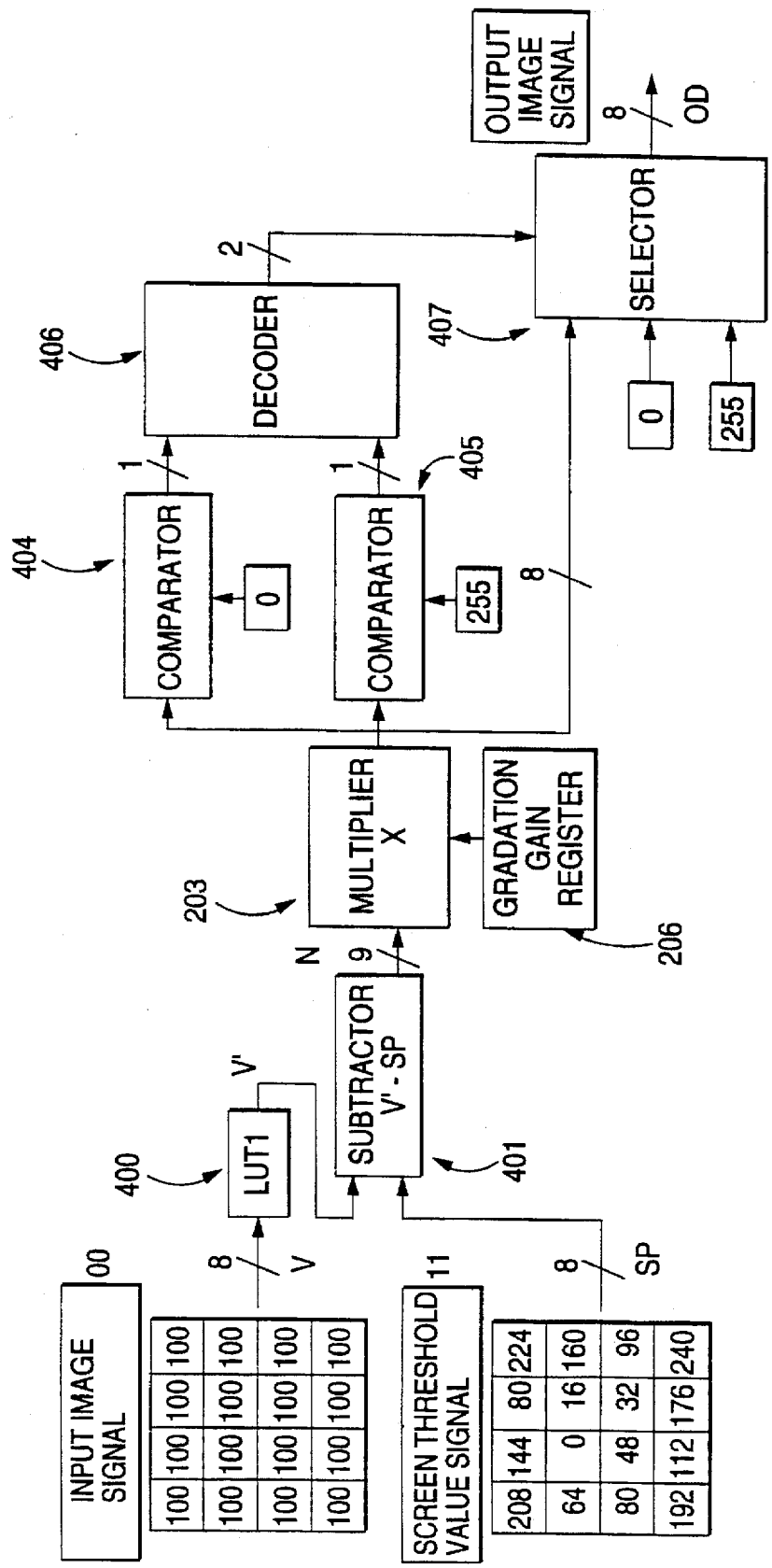
FIG. 10 is a block diagram of an output pixel value calculation circuit in a second embodiment of the invention.

Next, a second embodiment of the invention will be discussed. The configuration of the second embodiment is the same as that of the first embodiment except that an output pixel value calculation circuit shown in FIG. 10 is provided in place of the output pixel value calculation circuit 20 in the first embodiment. In FIG. 10, numeral 400 is a look-up table for correcting the characteristic of input image signal V so that the density of an output image becomes linear. The corrected input image signal is called "corrected input image signal V'".

Numeral 401 is a subtractor which subtracts density threshold value SP from the corrected input image signal V' and outputs value N as the subtraction result. The density threshold value SP is a value resulting from subtracting gradation step value D from density threshold value S in the first embodiment (FIG. 3). Next, as in the first embodiment, the value N is supplied to a multiplier 203 which then multiplies the value N by gradation gain G stored in a gradation gain register 206 and outputs the multiplication result in "two's complement" form.

Numerals 404 and 405 are comparators. The comparator 404 determines whether or not the multiplication result output from the multiplier 203 is less than 0, and the comparator 405 determines whether or not the multiplication result exceeds 255. Numeral 406 is a decoder which outputs a selection signal for determining image density signal OD based on the comparison results.

Numeral 407 is a selector which outputs the image density signal OD based on the selection signal. That is, the selector 407 outputs 0 as the image density signal OD if the multiplication result is less than 0; 255 if the multiplication result exceeds 255; or the multiplication result if the multiplication result is in the range of 0 to 255.

According to the embodiment, if the characteristic of the look-up table 400 is through, a similar output result is produced by a simpler configuration than the output pixel value calculation circuit 20 in the first embodiment. Moreover, in the second embodiment, the look-up table 400 also enables the input image signal V to be corrected so that the density of an output image becomes linear as much as possible.

Figure 15B:
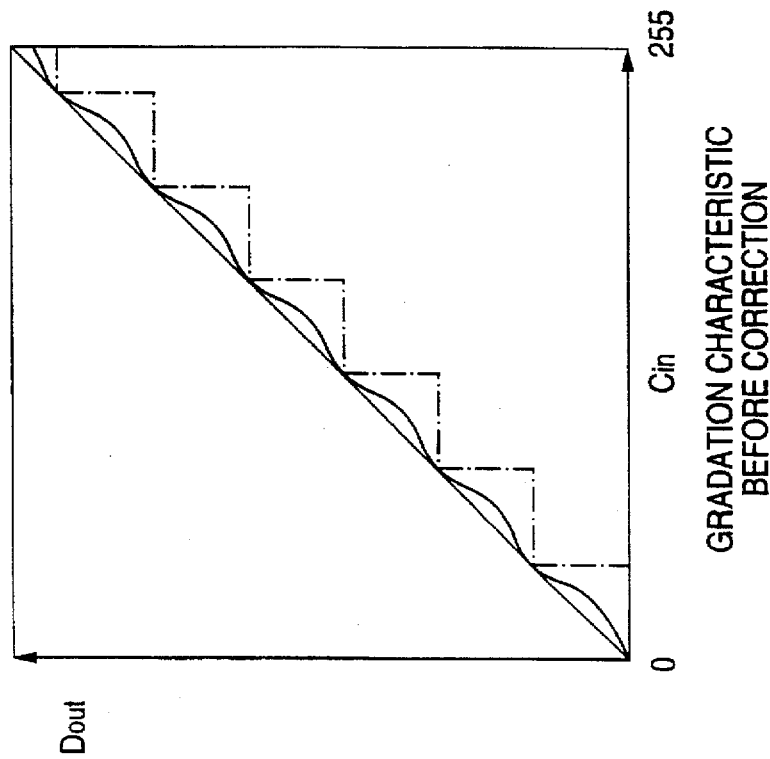
FIGS. 15A and 15B are illustrations of the operation of image processing systems of the second to fourth embodiments.
Figure 15A:
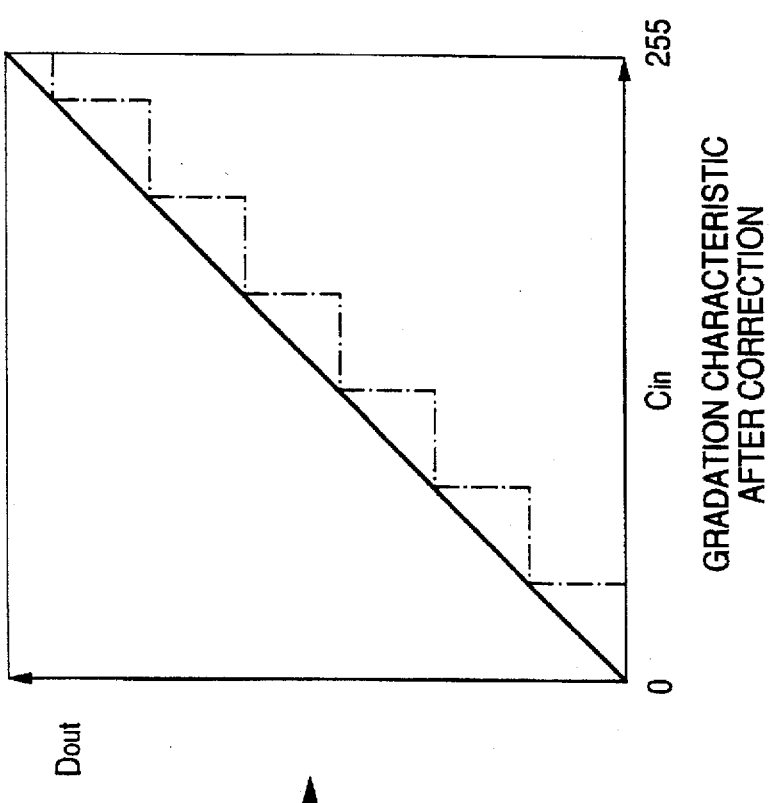

Here, a specific example of correction with the look-up table 400 will be discussed with reference to FIGS. 15A and 15B. FIG. 15A shows the reproduction characteristic of tone provided by the screen generation system according to the above-described configuration. The tone reproduction characteristic produced by the system is provided by combining a stepwise gradation reproduction characteristic of a digital portion assumed by on (255) pixels of a screen pattern (alternate long and short dash line) and a continuous gradation reproduction characteristic of an analog portion assumed by pixels at intermediate density levels.

Thus, unless the stepwise and continuous gradation reproduction characteristics become linear, discontinuous points occur in the gradation characteristic as indicated by the heavy line in the figure, causing pseudo contours to occur in an output image. Therefore, the table values in the look-up table 400 may be set so as to correct the reproduction characteristics as linear characteristics.

III. Third embodiment

In the reproduction characteristic before correction shown in FIG. 15A, an error for the linear characteristic varies substantially with gradation step value D as a cycle. That is, discontinuous points occur in setting the continuous gradation reproduction area of the analog portion. In such a state, the continuous gradation reproduction characteristic of the analog portion and the stepwise gradation reproduction characteristic of the digital portion are separately set, whereby the gradation characteristic can be corrected easier and with higher accuracy.

Figure 11:
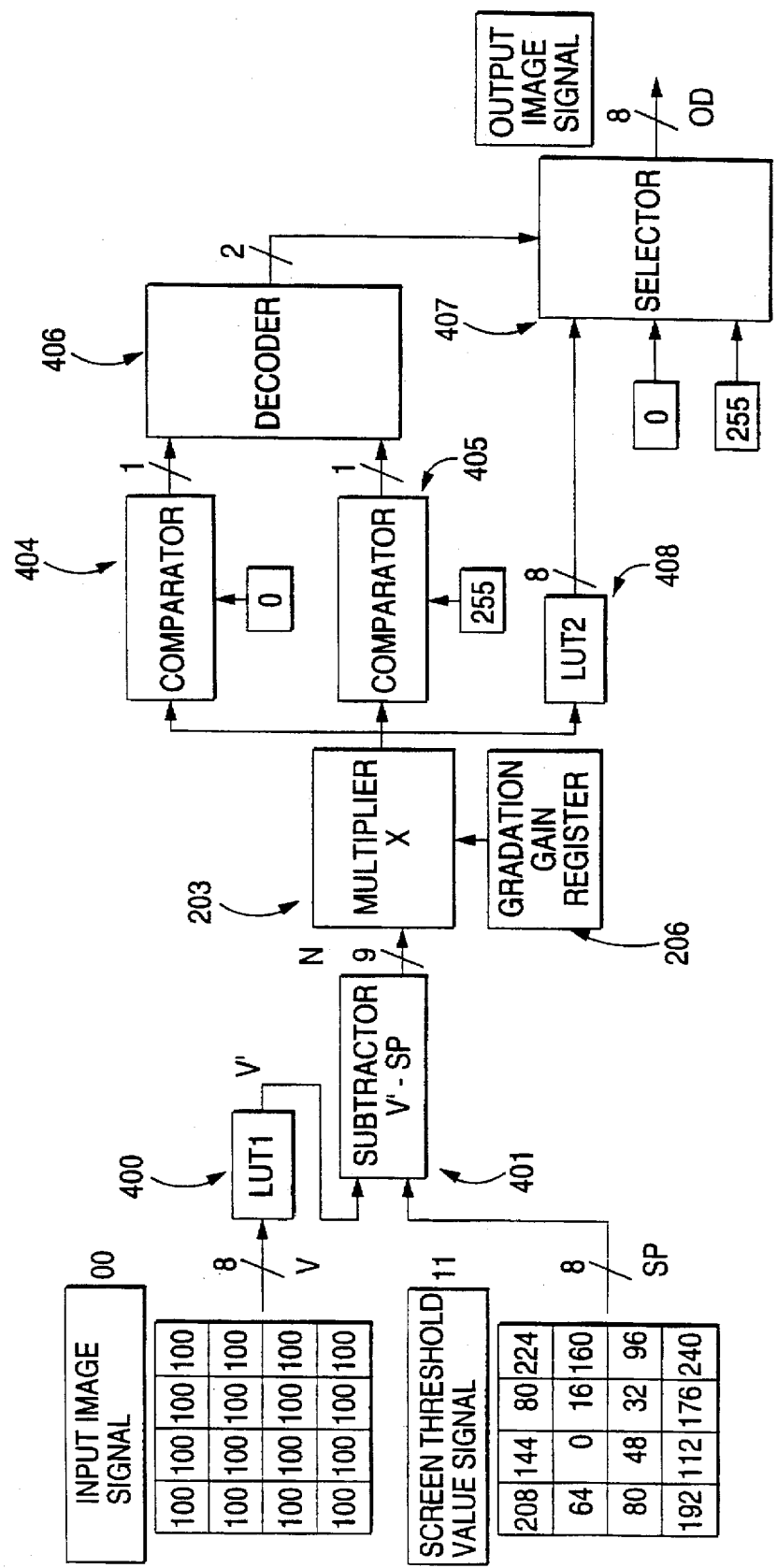
FIG. 11 is a block diagram of an output pixel value calculation circuit in a third embodiment of the invention.

A third embodiment of the invention is configured from such a viewpoint and uses an output pixel value calculation circuit shown in FIG. 11 in place of the output pixel value calculation circuit in the second embodiment (FIG. 10). In FIG. 11, a look-up table 408 for correcting the gradation reproduction characteristic of an analog portion is located between a multiplier 203 and a selector 407. The second and third embodiments are the same in other components.

In the configuration, a look-up table 400 is mainly used to correct the stepwise gradation reproduction characteristic of a digital portion. The look-up table 408 is used to correct the gradation reproduction characteristic of an analog portion. A table value setting example in the look-up table 408 will be discussed with reference to FIGS. 16A and 16B.

Figure 16A:
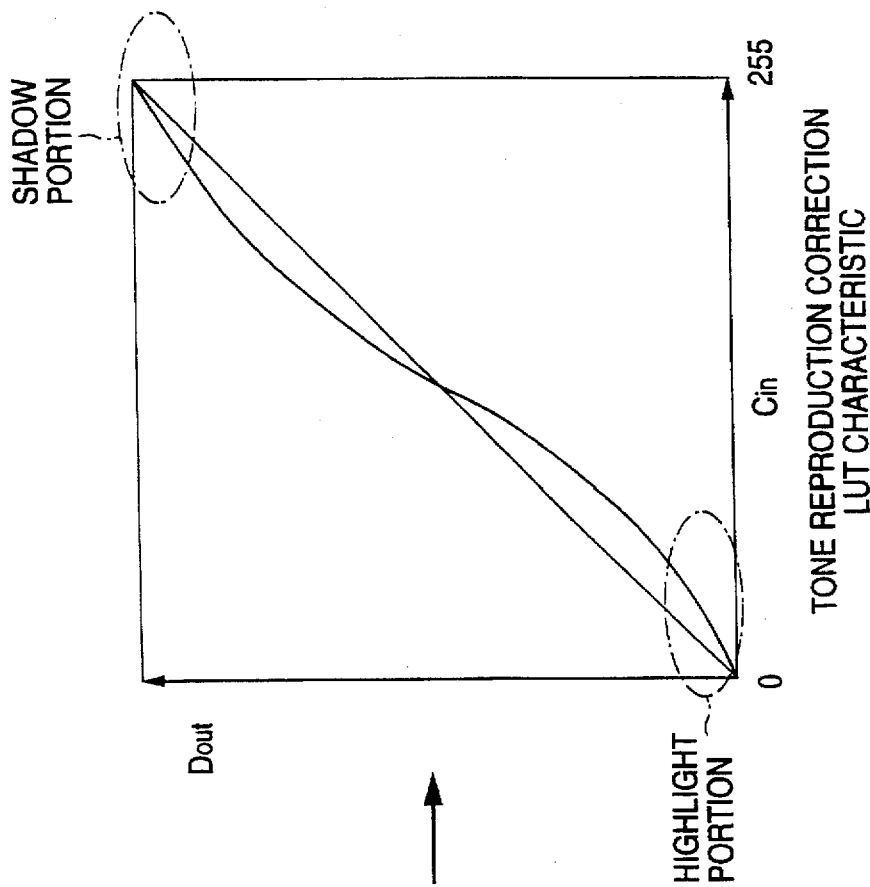
FIGS. 16A and 16B are illustrations of the operation of image processing systems of the third and fourth embodiments.
Figure 16B:
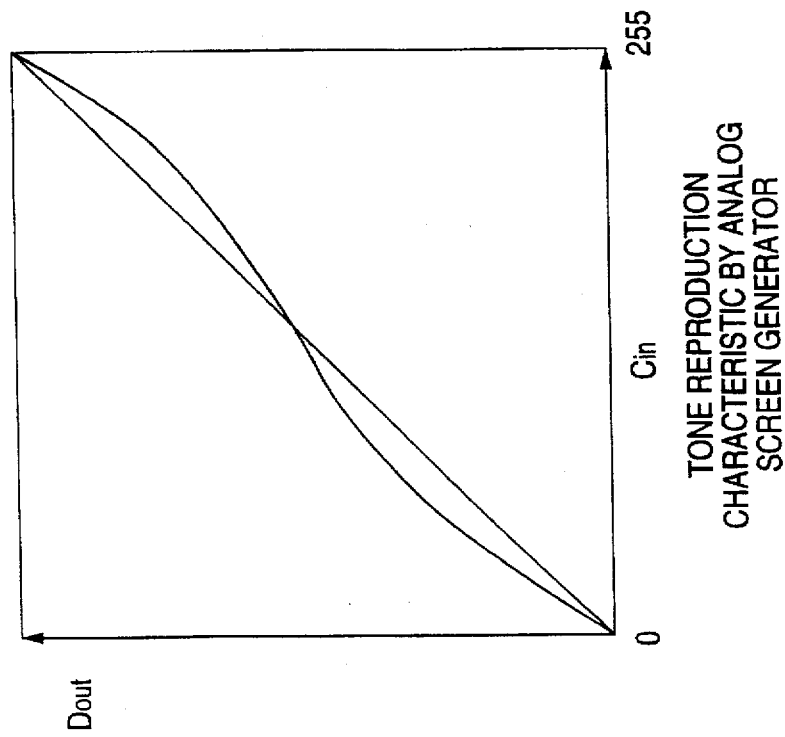

First, FIG. 16A is an example of the tone reproduction characteristic of an analog portion. In contrast, for the table values of the look-up table 408, the inverse function contents of the tone reproduction characteristic are stored to correct the tone reproduction characteristic as a linear characteristic. However, the table values in highlight and shadow portions surrounded by alternate long and short dash lines in FIG. 16B are changed so that the tone reproduction characteristic becomes smooth.

IV. Fourth embodiment

As described above, the waveform control multivalue conversion circuit 30 in the first to third embodiments selects either the digital signal corresponding to a triangular wave signal in a half period of the falling edge or the digital signal corresponding to a triangular wave signal in a half period of the rising edge based on the screen change signal SCS. However, both the digital signals may differ in tone reproduction characteristic.

Figure 12:
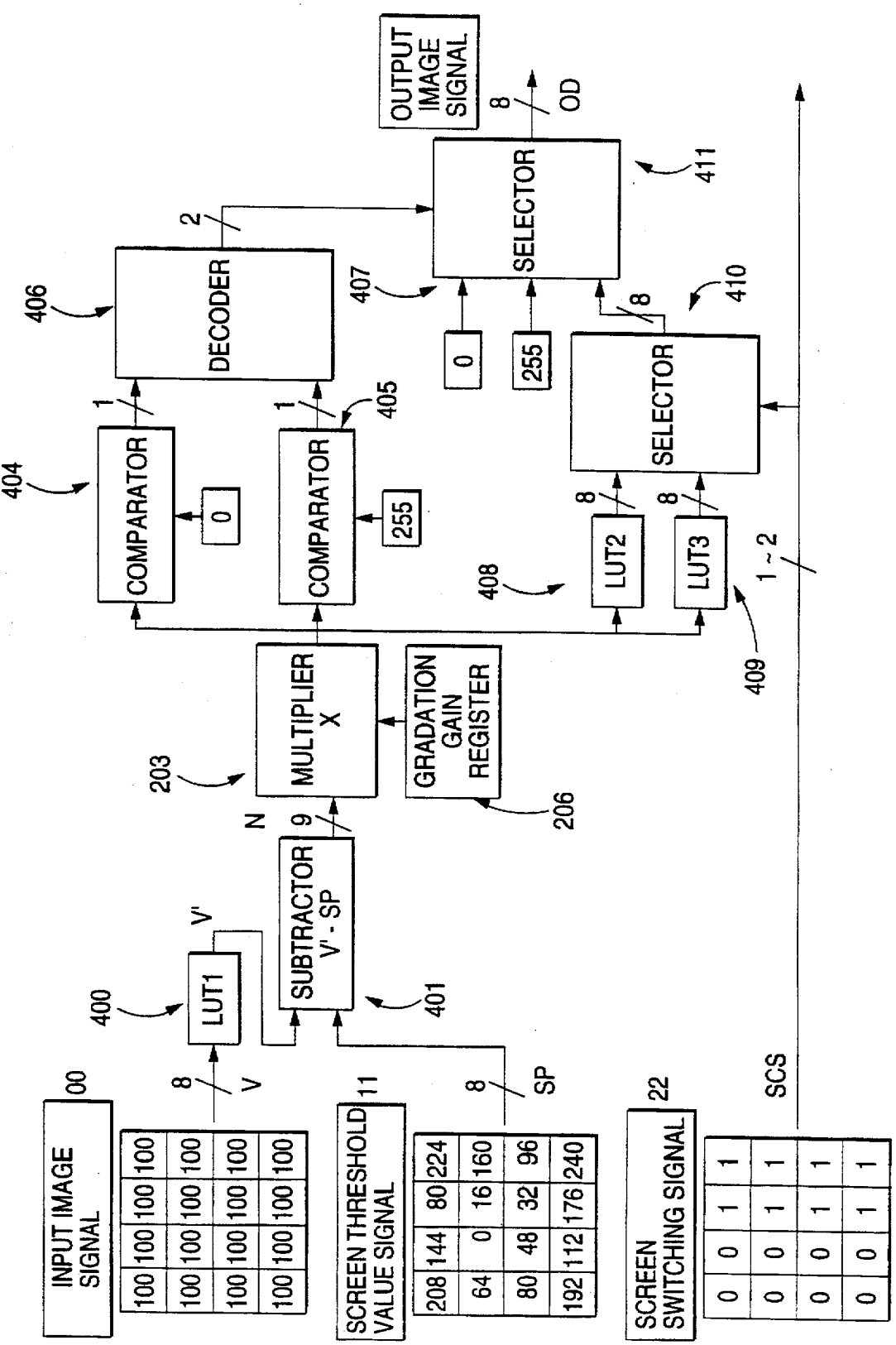
FIG. 12 is a block diagram of an output pixel value calculation circuit in a fourth embodiment of the invention.

A fourth embodiment of the invention, which is intended to make corrections containing the difference, uses an output pixel value calculation circuit shown in FIG. 12 in place of the output pixel value calculation circuit in the third embodiment (FIG. 11). In FIG. 12, look-up tables 408 and 409 and a selector 411 for selecting output of either of the look-up tables are located between a multiplier 203 and a selector 407.

The look-up table 408 stores table values for correcting the tone reproduction characteristic in a half period of the falling edge. Likewise, the look-up table 409 stores table values for correcting the tone reproduction characteristic in a half period of the rising edge.

If the screen change signal SCS (growth pattern) is "0," the selector 410 selects an output signal of the look-up table 408; if the screen change signal SCS (growth pattern) is "1," the selector 410 selects an output signal of the look-up table 409, whereby the difference between the tone reproduction characteristics in a half period of the rising edge and a half period of the falling edge can also be corrected.

V. Modified forms

Figure 9A:
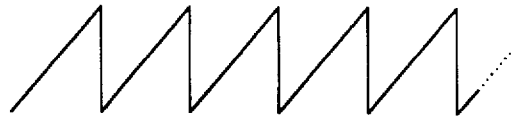
FIGS. 9A and 9B are waveform diagrams of a modification of the first embodiment.
Figure 9B:

The invention is not limited to the embodiments we have discussed; for example, the following modifications are possible:

1) The embodiments use triangular wave signals having a phase difference of 180 degrees therebetween as first and second triangular wave signals, but reference signals (or triangular wave signals) in the invention are not limited to them. For example, a triangular wave signal of a period of a half of both the triangular wave signals or two sawtooth wave signals as shown in FIGS. 9A and 9B are generated and one of them may be selected as a reference signal based on the screen change signal SCS.

2) The embodiments we have discussed use the density pattern method, but can also be applied if the dither method is used. That is, the "subpixel" in the embodiments may be considered as "one pixel" in the dither method and an image density signal by the dither method may be used as the image density signal OD, whereby n input pixels Q1, Q2, . . . , Qn are converted into n output pixels R1, R2, . . . , Rn corresponding thereto.

3) In the embodiments we have discussed, the growth pattern memory 111 has a memory capacity of 17×17 bits. However, if any other screen pattern than those shown in FIGS. 7A and 7B is used, the size of the growth pattern memory 111 should also be set in response to the pattern used, needless to say.

4) Although the growth pattern memory 111 stores value "1" or "0" corresponding to "growth pattern from right" or "growth pattern from left," the growth pattern types may be increased and the types of stored values may be increased accordingly. For example, if "growing pattern from center to both sides" is also provided, the total number of growth pattern types is raised to three, thus the memory capacity of the growth pattern memory 111 needs to be set to "17×17×2 bits."

As we have discussed, according to the first or fourth aspect of the invention, even if the number of subpixels (or the number of output pixels), n, is small, the number of reproduction gray levels can be set to a high value. Further, according to the second, third, fifth and sixth aspects of the invention, the image processing system sets a portion of the area corresponding to intermediate-density subpixel Pk+1 (or output pixel Rk+1) adjoining any of subpixels P1, P2, . . . , Pk (or output pixels R1, R2, . . . , Rk) to a high-density area and other portions to a low density, so that the halftone dot shade is not lost and high-quality output images can be provided stably.

Further, according to the seventh to ninth aspects of the invention, since gradation of intermediate-density subpixel Pk+1 or output pixel Rk+1 is corrected by the gradation correction means, higher-accuracy and higher-quality output images can be provided stably.

What is claimed is:

1. An image processing system for converting an input pixel into n subpixels P1, P2, . . . , Pn, said system comprising:

means for comparing density threshold values D1, D2, . . . , Dn (where D1<D2<. . . <Dn) corresponding to the subpixels P1, P2, . . . , Pn with a density of the input pixel, Din; and density setting means for setting subpixels P1, P2, . . . , Pk corresponding to density threshold values D1, D2, . . . , Dk of the density threshold values D1, D2, . . . , Dn (where k <n) less than the density Din to a high density, setting subpixels Pk+2, . . . , Pn to a low density, and setting subpixel Pk+1 to an intermediate density.

2. The image processing system as claimed in claim 1 wherein said density setting means sets an area corresponding to subpixel Pk+1 to a high-density area and a low-density area based on relationship between the density Din and the density threshold values Dk and Dk+1.

3. The image processing system as claimed in claim 2 wherein said density setting means comprises:

intermediate density signal generation means for outputting an intermediate density signal based on the relationship between the density Din and the density threshold values Dk and Dk+1;

reference signal generation means for outputting a predetermined reference signal; and means for comparing the intermediate density signal with the reference signal, and sets a part of the area corresponding to subpixel Pk+1 to a high density and other portions to a low density based on the comparison result of said comparison means.

4. The image processing system as claimed in claim 3 wherein said reference signal generation means generates a plurality of reference signals, said image processing system further including:

means for storing growth patterns provided in a one-to-one correspondence with n subpixels P1, P2, . . . , Pn; and means for selecting one of the reference signals based on the contents stored in said growth pattern storage means.

5. The image processing system as claimed in claim 3 wherein the intermediate density signal generated by said density setting means is an analog signal, and wherein said reference signal generation means comprises:

first triangular wave signal generation means for generating a first triangular wave signal;

second triangular wave signal generation means for generating a second triangular wave signal having a 180-degree phase difference from the first triangular wave signal;

selection condition storage means for storing selection data for specifying either a rising state or a falling state corresponding to each of the subpixels P1, P2, ..., Pn; and selection means for selecting either the first or second triangular wave signal based on the selection data corresponding to the subpixel Pk+1 and outputting the selected signal as the reference signal.

6. The image processing system as claimed in claim 2 wherein said density setting means sets a ratio between the high-density and the low-density areas so as to substantially equal a ratio between a difference between Din and Dk and a difference between Dk+1 and Din.

7. The image processing system as claimed in claim 1 wherein said density setting means sets a portion of the area corresponding to subpixel Pk+1 adjoining any of subpixels P1, P2, ..., Pk to a high-density area.

8. The image processing system as claimed in claim 1 wherein said density setting means comprises gradation correction means for correcting gradation of the intermediate density.

9. An image processing system for converting n input pixels Q1, Q2, ..., Qn into n output pixels R1, R2, ..., Rn corresponding thereto, said system comprising:

means for comparing density threshold values D1, D2, ..., Dn (where D1<D2<...<Dn) corresponding to the output pixels R1, R2, ..., Rn with densities of the corresponding input pixels Q1, Q2, ..., Qn; and density setting means for setting output pixels R1, R2, ..., Rk corresponding to density threshold values D1, D2, ..., Dk of the density threshold values D1, D2, ..., Dn (where k <n) less than the densities of the corresponding input pixels Q1, Q2, ..., Qn to a high density, setting output pixels Rk+2, ..., Rn to a low density, and setting output pixel Rk+1 to an intermediate density.

10. The image processing system as claimed in claim 9 wherein said density setting means sets an area corresponding to output pixel Rk+1 to a high-density area and a low-density area based on relationship between the pixels Qk and Qk+1 and the density threshold values Dk and Dk+1.

11. The image processing system as claimed in claim 10 wherein said density setting means comprises:

intermediate density signal generation means for outputting an intermediate density signal based on the relationship between the pixels Qk and Qk+1 and the density threshold values Dk and Dk+1;

reference signal generation means for outputting a predetermined reference signal; and means for comparing the intermediate density signal with the reference signal, and sets a part of the area corresponding to subpixel Rk+1 to a high density and other portions to a low density based on the comparison result of said comparison means.

12. The image processing system as claimed in claim 11 wherein the intermediate density signal generated by said density setting means is an analog signal, and wherein said reference signal generation means comprises:

first triangular wave signal generation means for generating a first triangular wave signal;

second triangular wave signal generation means for generating a second triangular wave signal having a 180-degree phase difference from the first triangular wave signal;

selecting condition storage means for storing selection data for specifying either a rising state or a falling state corresponding to each of the output pixels R1, R2, ..., Rn; and selection means for selecting either the first or second triangular wave signal based on the selection data corresponding to the output pixel Rk+1 and outputting the selected signal as the reference signal.

13. The image processing system as claimed in claim 9 wherein said density setting means sets a portion of the area corresponding to output pixel Rk+1 adjoining any of output pixels R1, R2, ..., Rk to a high-density area.

14. The image processing system as claimed in claim 9 wherein said density setting means comprises gradation correction means for correcting gradation of the intermediate density.

* * * * *